April 13, 1926.
LE ROY H. CRANDALL
COUPLING FOR METAL LINED HOSE
Filed Sept. 27, 1924
1,580,964
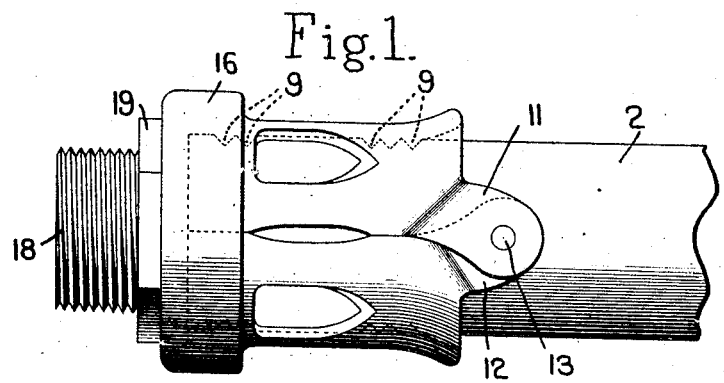
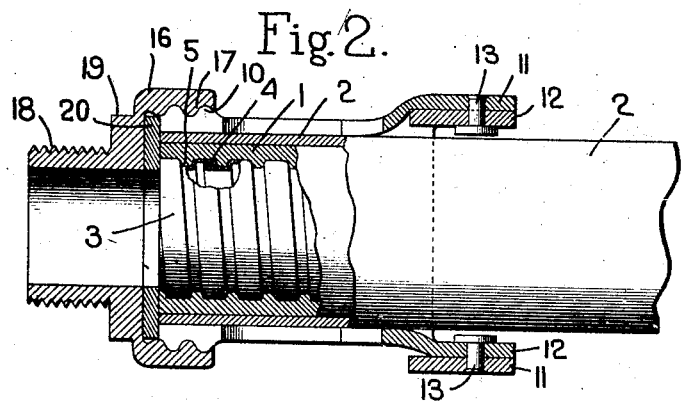
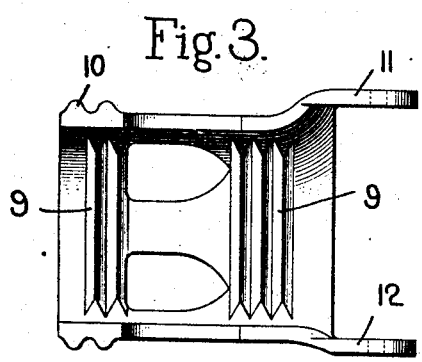
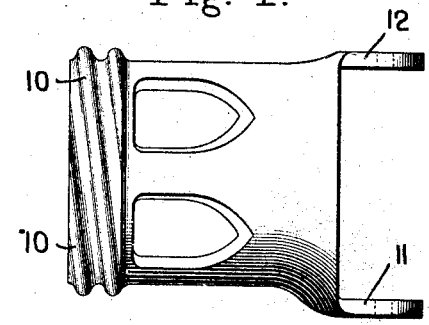
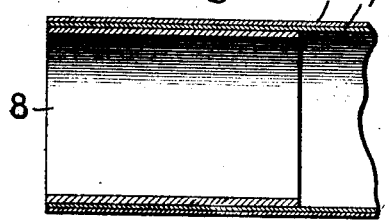
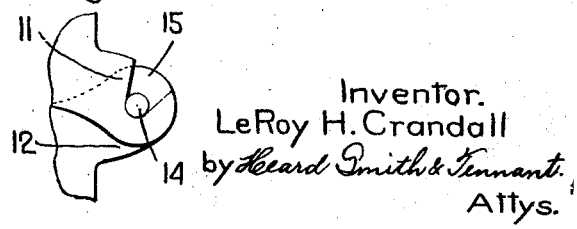
Inventor.
LeRoy H. Crandall
by Heard Smith & Tennant
Attys.

Patented Apr. 13, 1926.

1,580,964

UNITED STATES PATENT OFFICE.

LE ROY H. CRANDALL, OF ROXBURY, MASSACHUSETTS.

COUPLING FOR METAL-LINED HOSE.

Application filed September 27, 1924. Serial No. 740,213.

*To all whom it may concern:*

Be it known that I, LE ROY H. CRANDALL, a citizen of the United States, and a resident of Roxbury, county of Suffolk, State of Massachusetts, have invented an Improvement in Couplings for Metal-Lined Hose, of which the following description, in connection with the accompanying drawing, is a specification, like characters on the drawing representing like parts.

This invention relates to a hose coupling. It is particularly designed for use in connection with a hose having an internal cylindrical metal reinforcement, and more particularly for the ordinary type of metal-lined hose such as commonly employed in distributing gasoline and volatile liquids. In the latter case, the metal reinforcement is built into the hose construction, the hose usually comprising an exterior tube of rubber and fabric and an interior metal lining formed by a helical winding of a strip of metal of substantially S-shape in cross section, so arranged that the successive coils interlock with one another, a rubber strip being wound with the strip of metal to insure a gas and liquid type joint between the successive coils.

The object of the present invention is to provide a coupling for this type of hose which may readily be attached to the hose and readily be removed therefrom when it is desired to repair the hose or change the position of the coupling.

These and other objects and features of the invention will appear more fully from the accompanying description and drawings and will be particularly pointed out in the claims.

In the drawings:

Fig. 1 is a side elevation of a preferred form of coupling embodying the invention in place on the end of a hose length.

Fig. 2 is a view in central cross section taken transversely of Fig. 1 with the layers of the hose cut away to show its general construction.

Fig. 3 is a plan view of the interior of one of the sleeve parts forming the connection.

Fig. 4 is a plan view of the exterior of one of the said sleeve parts.

Fig. 5 is a view in transverse cross section of the end of a hose length showing a different construction of hose and metal reinforcement.

Fig. 6 is a detail in side elevation showing a modification of the hinge connection between the sleeve parts.

The coupling of this invention is designed particularly for use in connection with a hose provided with an internal cylindrical metal reinforcement. This metal reinforcement may be, and usually is, a permanent part of the hose construction, as in the case of the ordinary metal-lined hose employed, for example, in transmitting gasoline and other volatile liquids.

Such an ordinary type of metal-lined hose is shown in Figs. 1 and 2. In this type, the main body of the hose is composed of a cylindrical core 1 of rubber or rubber compound and an exterior covering 2 of fabric. The core and covering are vulcanized or suitably united together, thus forming a very tough, durable and wear resisting hose. In order to insure that the hose shall be gas and liquid type, it is provided with a metal lining which is usually formed from a strip of metal 3 S-shape in cross section. This strip of metal is wound helically so that the successive coils interlock with one another and where these coils interlock, there is interposed a packing strip 4 of rubber or suitable material so that a gas and liquid type joint is formed between the successive coils. Furthermore, the metal lining is forced into the rubber portion 1 of the hose so that a rib 5 of the rubber projects into the exterior surface of the metal lining.

The internal cylindrical metal reinforcement thus formed by the metal lining of this type of hose is particularly of interest in connection with this invention because it is utilized to support the thrust of the hose coupling when it is clamped in place, or, in other words, the exterior material of the hose such as the rubber 1 and fabric 2 are clamped between this metal reinforcement and the sleeve which forms an essential element of the coupling of this invention. A similar result may therefore be secured by making the cylindrical metal reinforcement as a separate element and inserting it into the interior of a hose section to which the coupling is to be attached. Such a construction is illustrated in Fig. 5 where the exterior material of the hose comprises the layers 6 and 7, and where the metal reinforcement consists of a plain cylindrical metal sleeve 8 forced into the interior of the hose section. The coupling itself comprises two main elements, viz, a sleeve and a cap connection.

The sleeve is formed of suitable metal in two parts of general semi-cylindrical shape. Each part is preferably a duplicate of the other, so that the parts may be cast or died out by the same method or die. One of these parts is illustrated in detail in Figs. 3 and 4. On the interior surface are formed projections adapted to bite into the exterior material of the hose. These projections are conveniently shown as V-shaped ribs 9 extending transversely of the sleeve part, a portion of the ribs being located near each end. At the outer end, each sleeve is provided with exterior screw threads 10 and these screw threads are so arranged that when the sleeve parts are in closed position to make the complete sleeve, the threads will extend in continuity. At the inner end, each sleeve part is provided with a pair of diametrically oppositely arranged extensions 11 and 12. It will be noted that the extension 11 is farther from the axis of the sleeve than the extension 12. Consequently when the sleeve parts are fitted together, the extension 11 of one part will fit over the extension 12 of the other part at both sides, as shown in Fig. 2. These opposed members 11 and 12 of the pairs of extensions are hinged together on a diametrical axis. This hinge connection can be made in any suitable manner. In Figs. 1-4, inclusive, the pivotal connection is effected by the rivets 13, the axes of which lie in substantially the same diametrical line and which thus permanently unite the two sleeve parts. In the modification illustrated in Fig. 6, the pin 14 is made a permanent or integral part of one extension, while the other extension is notched or cut away at 15 to hook or fit over the pin. This enables the sleeve parts to be separated when desired.

The sleeve, with its extensions, is so constructed that when it is swung to open position or sufficiently open so that the projections 9 lie outside the periphery of the hose to which the coupling is to be attached, the opening at the inner end of the sleeve will be greater than the cross sectional area of the hose. This is necessary in order to enable the sleeve to be slipped over the hose, and is due to the fact that the hinged connection is formed in the diametrically opposite extensions projecting longitudinally from the inner ends. With this principle of construction it will be seen that the extreme inner end of each sleeve part swings away from the hose surface as the sleeve parts are swung upon on the rivets 13.

The second element of the coupling is the cap connection. This comprises a body portion 16 threaded internally at 17 to cooperate with the screw threads 10, so that it is adapted to screw over the threaded outer end of the sleeve when in a closed position and thus lock the sleeve parts firmly together in this closed position. The shape of the remainder of the cap element will depend upon the nature of the coupling, as, for example, whether it is of the male or female type. The former type is illustrated, having a threaded portion 18 and the polygonal section 19 to which a wrench may be applied.

A sealing washer 20 of suitable packing material is provided to be placed between the extreme end of the hose and the face of the body of the cap 16. The slight flare at the inner end of the two part sleeve enables the hose to flex without being cut or worn by the inner end of the sleeve.

The operation of the construction will be apparent. In order to attach the coupling, the two-part sleeve is swung open slightly and its inner end then slipped on over the end of the hose until the outer end of the sleeve aligns with the extreme end of the hose. The sleeve is then place in a vise or clamping tool and the sleeve parts forced into closed position. This causes the projections 9 to bite into the exterior material of the hose. The interior metal reinforcement of the hose enables this to be done and, together with the closed sleeve, serves to clamp the exterior hose material. The sealing washer is inserted in the cap connection and the cap connection is then screwed on the threaded outer end of the sleeve. This clamps the sealing washer between the cap and the end of the hose and locks the sleeve parts in closed position. Thus the firm union of the coupling with the hose is secured and a perfect gas or liquid type joint effected.

The coupling may easily be removed or replaced because all that is necessary to do is to unscrew the cap from the sleeve and repeat the operation.

The entire device is easily and economically manufactured and may be cast or formed by dies from brass or suitable material and requires little finishing.

Having thus described the invention, what is claimed as new, and desired to be secured by Letters Patent, is:

1. A hose coupling comprising a two part sleeve and a cap connection; the said sleeve parts having projections on their interior surfaces, having exterior screw threads at their outer ends so arranged when the parts are closed as to extend in continuity; and having a pair of diametrically opposite extensions projecting longitudinally from the inner end of each with the opposed members of the pairs hinged together on a diametrical axis and providing an opening through the inner end of the sleeve, when the parts are swung sufficiently to bring the projections outside the hose periphery, greater than the cross sectional area of the hose; and the cap connection being threaded internally to screw over the threaded outer end of the closed sleeve.

2. The combination of a hose provided with an internal cylindrical metal reinforcement and a coupling having the construction defined in claim 1, whereby when the coupling is in position the exterior material of the hose is firmly clamped between the metal reinforcement and the coupling sleeve with the said projections embedded therein.

3. A hose coupling comprising a two part sleeve, projections on the interior surface of the sleeve, a pair of diametrically opposite extensions projecting longitudinally from the inner end of each of the sleeve parts with the opposed extensions of each pair hinged together on a diametrical axis and providing an opening through the inner end of the sleeve, when the parts are swung sufficiently to bring the projections outside the hose periphery, greater than the cross sectional area of the hose, the sleeve when in closed position being of a diameter to fit the hose snugly with the said projections embedded in the material thereof, and means for locking the sleeve parts firmly together after they have been swung into closed position on the hose.

4. A hose coupling comprising the construction defined in claim 1 in which the cap connection extends radially inward beyond the interior surface of the sleeve, together with a sealing washer interposed between the outer end of the sleeve and the cap and projecting radially inward beyond the interior surface of the sleeve whereby when the cap is screwed onto the sleeve, a tight joint is effected between the coupling and the end of the hose.

In testimony whereof, I have signed my name to this specification.

LE ROY H. CRANDALL.